US008237773B2

(12) United States Patent
Yamamoto

(10) Patent No.: US 8,237,773 B2
(45) Date of Patent: Aug. 7, 2012

(54) COMMUNICATION SYSTEM AND METHOD, SENDING APPARATUS AND METHOD, RECEIVING APPARATUS AND METHOD, AND PROGRAM

(75) Inventor: Katsuya Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1353 days.

(21) Appl. No.: 11/738,026

(22) Filed: Apr. 20, 2007

(65) Prior Publication Data

US 2008/0263237 A1 Oct. 23, 2008

(51) Int. Cl.
*G06F 13/00* (2006.01)

(52) U.S. Cl. ........ 348/27

(58) Field of Classification Search ........ 348/27
See application file for complete search history.

(56) References Cited

U.S. PATENT DOCUMENTS

| | | | | |
|---|---|---|---|---|
| 6,839,055 | B1 * | 1/2005 | Nguyen | 345/204 |
| 6,930,706 | B2 * | 8/2005 | Kobayashi et al. | 348/65 |
| 7,099,416 | B2 * | 8/2006 | Pasqualino et al. | 375/349 |
| 7,243,291 | B1 * | 7/2007 | Williams | 714/776 |
| 7,340,655 | B2 * | 3/2008 | Sugita | 714/700 |
| 7,677,923 | B1 * | 3/2010 | Chen et al. | 439/541.5 |
| 7,963,809 | B2 * | 6/2011 | Hardell et al. | 439/680 |

OTHER PUBLICATIONS

"Digital Visual Interface DVI", Digital Display Working Group, Revision 1.0, Apr. 2, 1999, pp. 1-76.

* cited by examiner

*Primary Examiner* — David Eng
(74) *Attorney, Agent, or Firm* — Oblon, Spivak, McClelland, Maier & Neustadt, L.L.P.

(57) ABSTRACT

Disclosed herein is a communication system, including: a sending apparatus configured to transmit a Digital Visual Interface signal wherein pixel data formed from color data including red data, green data and blue data are disposed successively for the individually same color data through a Digital Visual Interface cable; and a receiving apparatus configured to receive the Digital Visual Interface signal transmitted from said sending apparatus through said Digital Visual Interface cable.

9 Claims, 9 Drawing Sheets

COMMUNICATION SYSTEM AND METHOD, SENDING APPARATUS AND METHOD, RECEIVING APPARATUS AND METHOD, AND PROGRAM

BACKGROUND OF THE INVENTION

1. Field of the Invention

This invention relates to a communication system and method, a sending apparatus and method, a receiving apparatus and method, and a program.

2. Description of the Related Art

The DVI (Digital Visual Interface) standards are available as existing standards for transmitting image data from a personal computer or a like apparatus to a display apparatus or a like apparatus.

According to the DVI standards, color data such as red data, green data and blue data representative of color gradients of red, green and blue (hereinafter referred to as R, G and B, respectively) regarding a predetermined pixel are adopted. Further, a combination of stream data composed of a plurality of red data disposed successively, stream data composed of a plurality of green data disposed successively and stream data of a plurality of blue data disposed successively is adopted as a transmission form of image data. In the following description, image data of the transmission form is suitably referred to as DVI signal.

Heretofore, such color data of red data, green data and blue data as mentioned above are transmitted as data of 8 bits of an upper limit, that is, as gradation data which can be represented in 256 gradations in the maximum.

It is to be noted that, in the following description, where there is no necessity to represent different color data of red data, green data and blue data distinctly from one another, they are collectively referred to as pixel data. In other word, data formed from a combination of red data, green data and blue data regarding a predetermined pixel are referred to as pixel data of the predetermined pixel. In this instance, k-bit (k is an arbitrary integral value) pixel data signifies data formed from a combination of red data of k bits, green data of k bits and blue data of k bits.

Meanwhile, together with the development of information processing technologies in recent years, the ability of personal computers and so forth on the sending side is enhanced. Thus, also personal computers have been provided which can handle pixel data of more than 8 bits, that is, pixel data of more than 256 gradations and consequently can produce image data formed from such pixel data. In the meantime, also the display capacity of display apparatus has been enhanced, and also display apparatus have appeared which have, as a display capacity of one pixel, a display capacity of more than 8 bits, that is, a display capacity of more than 256 gradations.

From such a situation as described above, it is demanded to expand the color gradients of R, G and B colors of the DVI signal to equal to or more than 8 bits.

SUMMARY OF THE INVENTION

However, in the present situation, such a demand as just described is not satisfied. This is because existing transmission systems for the DVI signal have a limitation to transmission of 8 bits in terms of a unit of pixel data.

Therefore, it is desirable to provide a communication system and method, a sending apparatus and method, a receiving apparatus and method, and a program by which color gradients of R, G and B colors of a DVI signal can be expanded equal to or to more than 8 bits.

According to an embodiment of the present invention, there is provided a communication system including a sending apparatus configured to transmit a Digital Visual Interface (DVI) signal wherein pixel data formed from color data including red data, green data and blue data are disposed successively for the individually same color data through a DVI cable, and a receiving apparatus configured to receive the DVI signal transmitted from the sending apparatus through the DVI cable, the sending apparatus being operable to utilize a Dual Link mode to transmit color data of 8 bits from within each of the pixel data formed from the color data of 8+N bits to the receiving apparatus through a first transmission path of the DVI cable, N being an arbitrary integral value equal to or greater than 1 but equal to or smaller than 8, and transmit color data of the remaining N bits from within each of the pixel data to the receiving apparatus through a second transmission path of the DVI cable, the receiving apparatus being operable to receive the color data of 8 bits and the color data of N bits through the first transmission path and the second transmission path, respectively, and synthesize the color data of 8 bits and the color data of N bits to restore the pixel data.

According to another embodiment of the present invention, there is provided a communication method for a communication system which corresponds to the communication system described above.

In particular, according to another embodiment of the present invention, there is provided a communication method for a communication system which includes a sending apparatus configured to transmit a DVI signal wherein pixel data formed from color data including red data, green data and blue data are disposed successively for the individually same color data through a DVI cable, and a receiving apparatus configured to receive the DVI signal transmitted from the sending apparatus through the DVI cable, including the step executed by the sending apparatus of utilizing a Dual Link mode to transmit color data of 8 bits from within each of the pixel data formed from the color data of 8+N bits to the receiving apparatus through a first transmission path of the DVI cable, N being an arbitrary integral value equal to or greater than 1 but equal to or smaller than 8, and transmit color data of the remaining N bits from within each of the pixel data to the receiving apparatus through a second transmission path of the DVI cable, and the steps executed by the receiving apparatus of receiving the color data of 8 bits and the color data of N bits through the first transmission path and the second transmission path, respectively, and synthesizing the color data of 8 bits and the color data of N bits to restore the pixel data.

According to a further embodiment of the present invention, there is provided a sending apparatus for transmitting a DVI signal wherein pixel data formed from color data including red data, green data and blue data are disposed successively for the individually same color data through a DVI cable, including a transmission controller configured to control so as to utilize a Dual Link mode to transmit color data of 8 bits from within each of the pixel data formed from the color data of 8+N bits through a first transmission path of the DVI cable, N being an arbitrary integral value equal to or greater than 1 but equal to or smaller than 8, and transmit color data of the remaining N bits from within each of the pixel data to the receiving apparatus through a second transmission path of the DVI cable.

The sending apparatus may further include a multiplexer configured to separate the color data of 8+N bits which form the pixel data into the color data of 8 bits and the color data of N bits, place, for each of the color data after the separation, the color data of 8 bits into first data of 8 bits which are effective at a rising edge of a dot clock while placing the color data of N bits into second data of 8 bits which are effective at a falling edge of the dot clock, multiplex the first data and the second data and output multiplexed data obtained by the multiplexing for each of the color data, the transmission controller including a first transmission controller configured to transmit data of 8 bits outputted for each color data after a timing of each rising edge of the dot clock from among the multiplexed data of the individual color data outputted from the multiplexer as the first data through the first transmission path, and a second transmission controller configured to transmit data of 8 bits outputted for each color data after the timing of each falling edge of the dot clock from among the multiplexed data of the individual color data outputted from the multiplexer as the second data through the second transmission path.

According to a still further embodiment of the present invention, there are provided a transmission method and a program which correspond to the sending apparatus described above.

In particular, according to a still further embodiment of the present invention, there are provided a transmission method for a sending apparatus for transmitting, and a program for causing a computer to control transmission of, a DVI signal wherein pixel data formed from color data including red data, green data and blue data are disposed successively for the individually same color data through a DVI cable, including the step of utilizing a Dual Link mode to transmit color data of 8 bits from within each of the pixel data formed from the color data of 8+N bits through a first transmission path of the DVI cable, N being an arbitrary integral value equal to or greater than 1 but equal to or smaller than 8, and transmit color data of the remaining N bits from within each of the pixel data to the receiving apparatus through a second transmission path of the DVI cable.

According to a yet further embodiment of the present invention, there is provided a receiving apparatus for receiving, when a DVI signal wherein pixel data formed from color data including red data, green data and blue data are disposed successively for the individually same color data is transmitted from a sending apparatus to the receiving apparatus through a DVI cable, the DVI signal, including a reception controller configured to control, when color data of 8 bits from within each of the pixel data formed from the color data of 8+N bits are transmitted through a first transmission path of the DVI cable, N being an arbitrary integral value equal to or greater than 1 but equal to or smaller than 8, and color data of the remaining N bits from within each of the pixel data are transmitted through a second transmission path of the DVI cable concurrently utilizing a Dual Link mode from the sending apparatus to the receiving apparatus, so as to receive the color data of 8 bits and the color data of N bits through the first transmission path and the second transmission path, respectively, and a synthesizer configured to synthesize the color data of 8 bits and the color data of N bits received under the control of the reception controller to restore the pixel data.

According to a yet further embodiment of the present invention, there are provided a reception method and a program which correspond to the receiving apparatus described above.

In particular, according to a yet further embodiment of the present invention, there are provided a reception method for a receiving apparatus for receiving, and a program for causing a computer to carry out control so as to receive, when a DVI signal wherein pixel data formed from color data including red data, green data and blue data are disposed successively for the individually same color data is transmitted from a sending apparatus to the computer through a DVI cable, the DVI signal, including the steps of receiving, when color data of 8 bits from within each of the pixel data formed from the color data of 8+N bits are transmitted through a first transmission path of the DVI cable, N being an arbitrary integral value equal to or greater than 1 but equal to or smaller than 8, and color data of the remaining N bits from within each of the pixel data are transmitted through a second transmission path of the DVI cable concurrently utilizing a Dual Link mode from the sending apparatus to the receiving apparatus, the color data of 8 bits and the color data of N bits through the first transmission path and the second transmission path, respectively, and synthesizing the color data of 8 bits and the color data of N bits to restore the pixel data.

With the communication system and method, sending apparatus and method, receiving apparatus and method and programs, transmission of the DVI signal can be carried out. Particular, the color gradient of R, G and B colors can be expanded to equal to or more than 8 bits.

DETAILED DESCRIPTION OF THE PREFERRED EMBODIMENT

Figure 1:
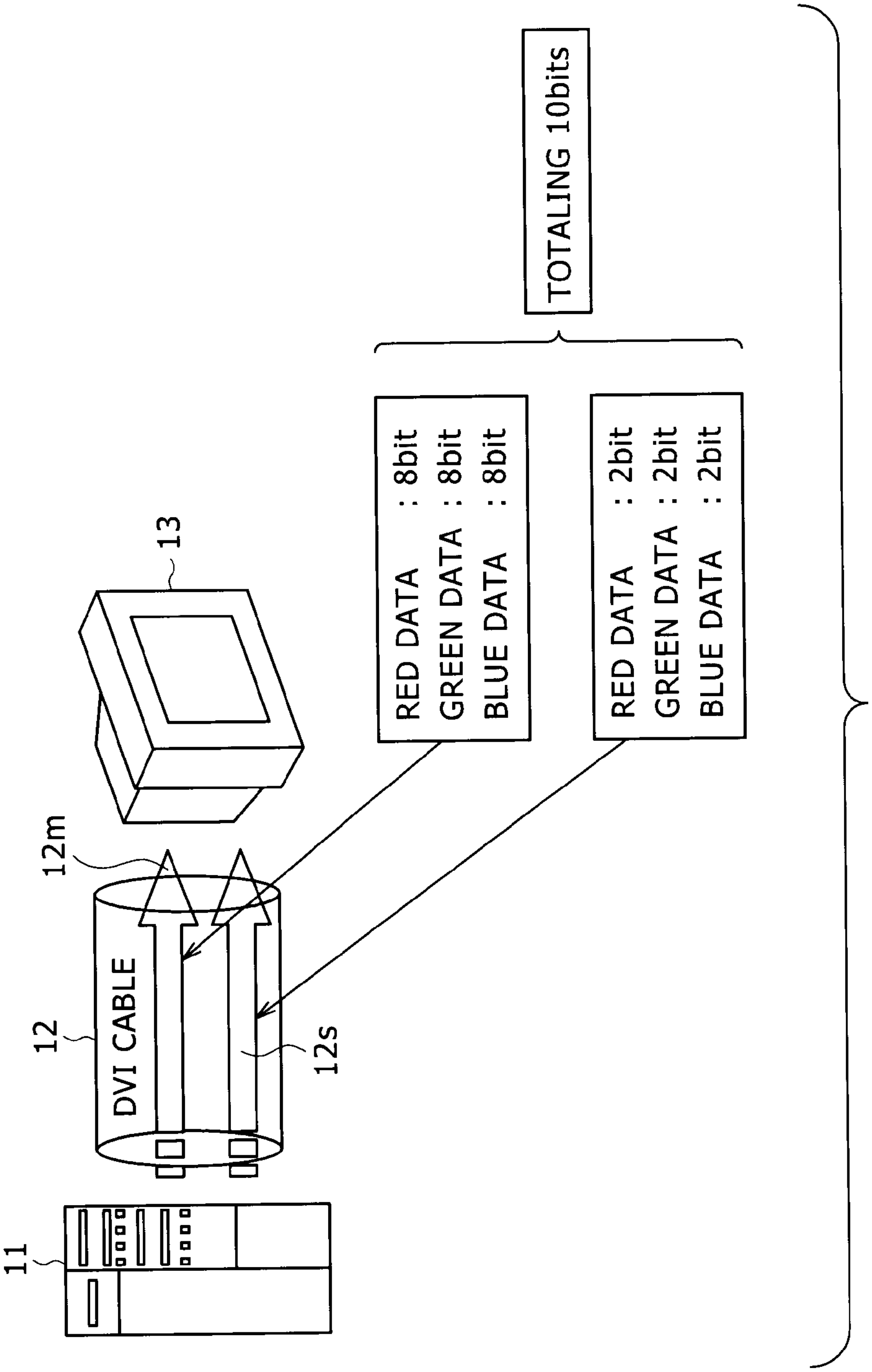
FIG. 1 is a schematic view showing an example of a configuration of a communication system to which the present invention is applied.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the present invention corresponding to particular elements described in the embodiment of the present invention is all described in the claims. In other words, the following description does not deny the presence of an invention which corresponds to a particular element described in the description of the embodiment of the present invention but is not recited in the claims, that is, the description does not deny the presence of an invention which may be filed for patent in a divisional patent application or may be additionally included into the present patent application as a result of later amendment to the claims.

According to an embodiment of the present invention, there is provided a communication system (for example, a communication system of FIG. 1) including a sending apparatus (for example, a sending apparatus 11 shown in FIG. 1) configured to transmit a DVI (Digital Visual Interface) signal wherein pixel data formed from color data including red data, green data and blue data are disposed successively for the individually same color data through a DVI cable (for example, a DVI cable 12 shown in FIG. 1), and a receiving apparatus (for example, a receiving apparatus 13 shown in FIG. 1) configured to receive the DVI signal transmitted from the sending apparatus through the DVI cable, the sending apparatus being operable to utilize a Dual Link mode to transmit color data of 8 bits from within each of the pixel data formed from the color data of 8+N bits to the receiving apparatus through a first transmission path (for example, a transmission path 12*m* shown in FIG. 1) of the DVI cable, N being an arbitrary integral value equal to or greater than 1 but equal to or smaller than 8, and transmit color data of the remaining N bits from within each of the pixel data to the receiving apparatus through a second transmission path (for example, a transmission path 12*s* shown in FIG. 1) of the DVI cable, the receiving apparatus being operable to receive the color data of 8 bits and the color data of N bits through the first transmission path and the second transmission path, respectively, and synthesize the color data of 8 bits and the color data of N bits to restore the pixel data.

According to another embodiment of the present invention, there is provided a sending apparatus (for example, a sending apparatus 11 shown in FIG. 1 and having a functional configuration shown in FIG. 2) for transmitting a DVI signal wherein pixel data formed from color data including red data, green data and blue data are disposed successively for the individually same color data through a DVI cable (for example, a DVI cable 12 shown in FIG. 1 or 2), including a transmission controller (for example, a master DVI transmission controller 25 and a sub DVI transmission controller 26) configured to control so as to utilize a Dual Link mode to transmit color data of 8 bits from within each of the pixel data formed from the color data of 8+N bits through a first transmission path (for example, a transmission path 12*m* of FIG. 1 or 2) of the DVI cable, N being an arbitrary integral value equal to or greater than 1 but equal to or smaller than 8, and transmit color data of the remaining N bits from within each of the pixel data to the receiving apparatus through a second transmission path (for example, a transmission path 12*s* of FIG. 1 or 2) of the DVI cable.

Figure 2:
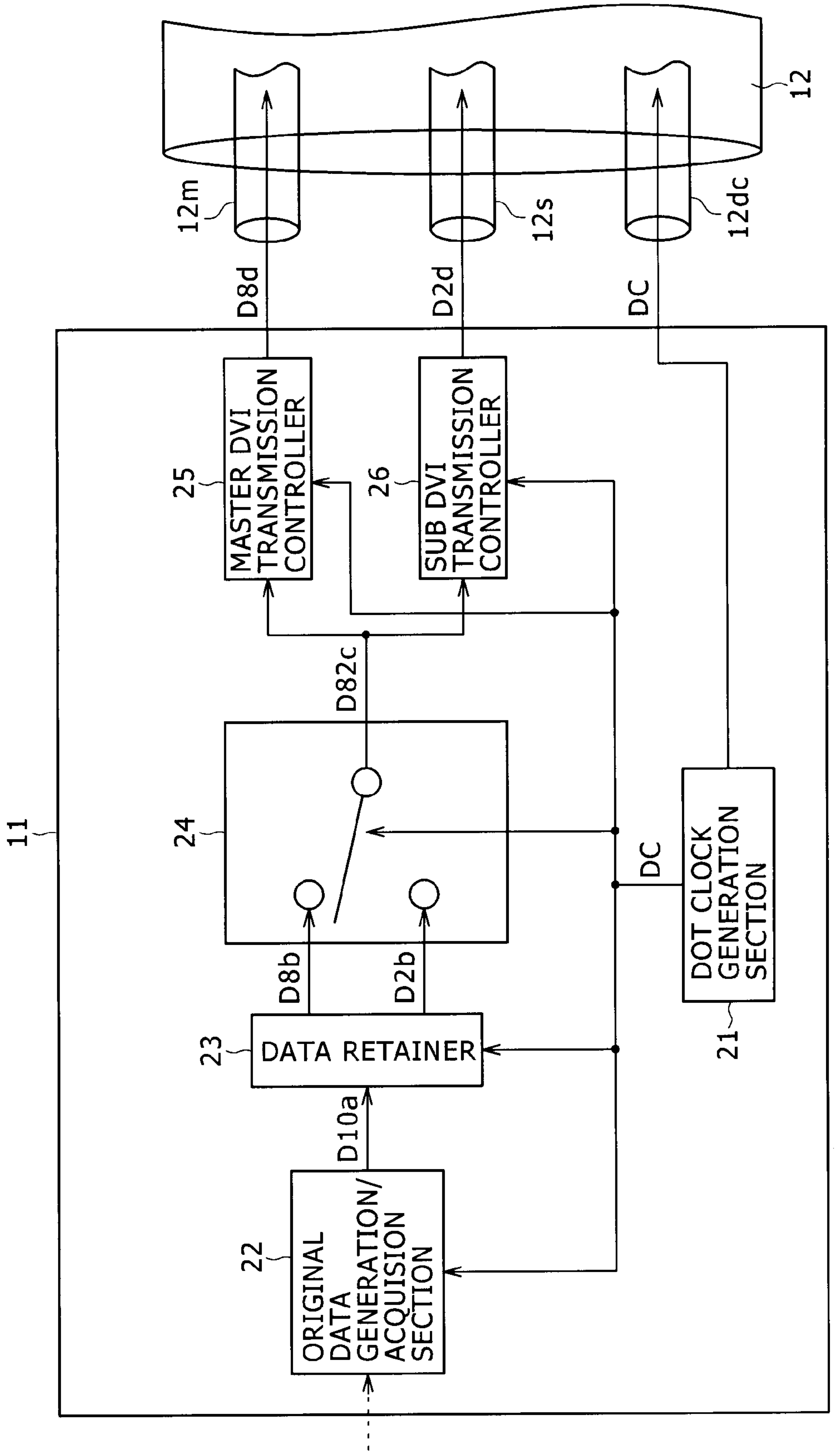
FIG. 2 is a block diagram showing an example of a functional configuration of a sending apparatus of the communication system of FIG. 1.
Figure 4:
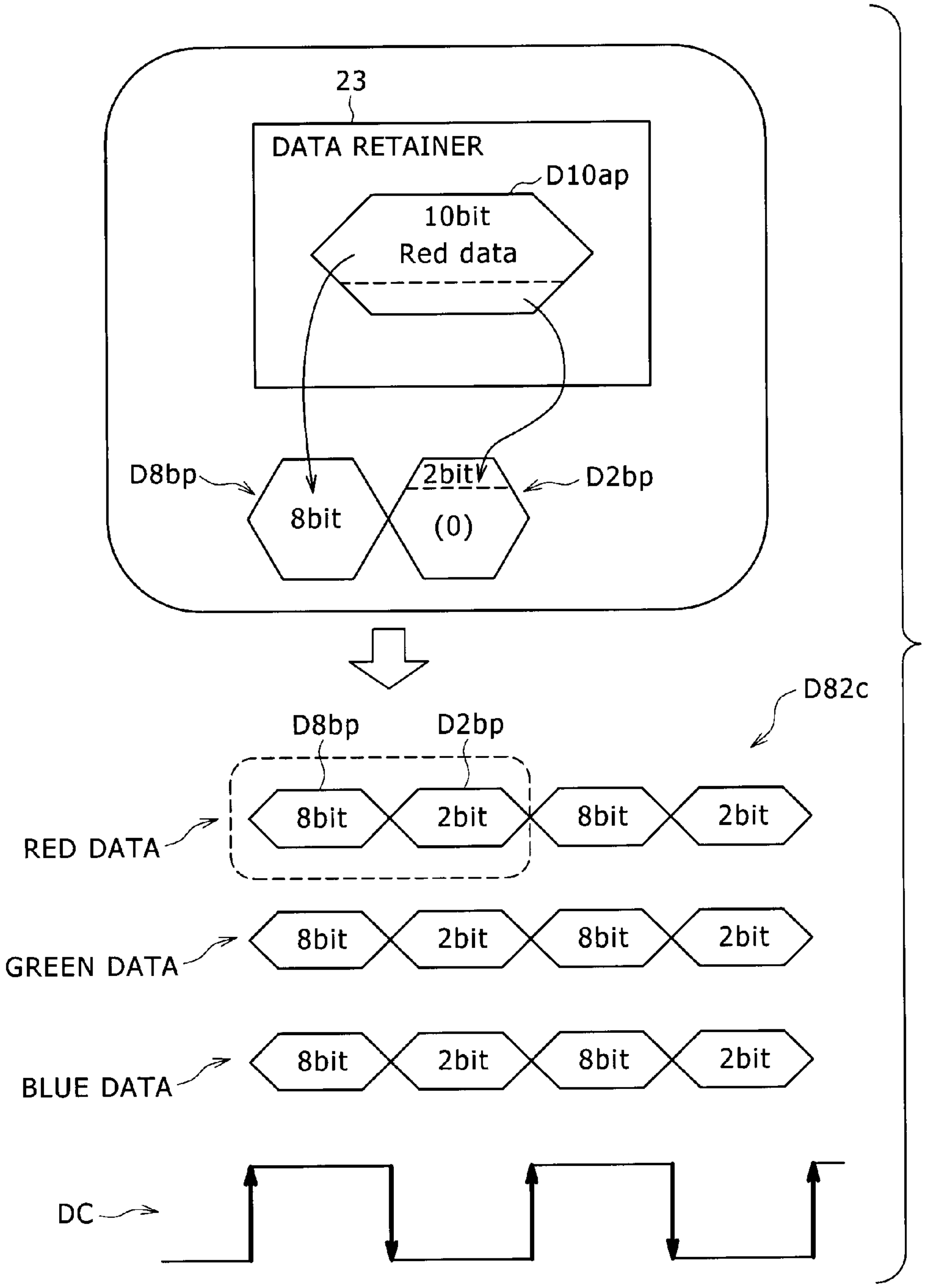
Figure 5:
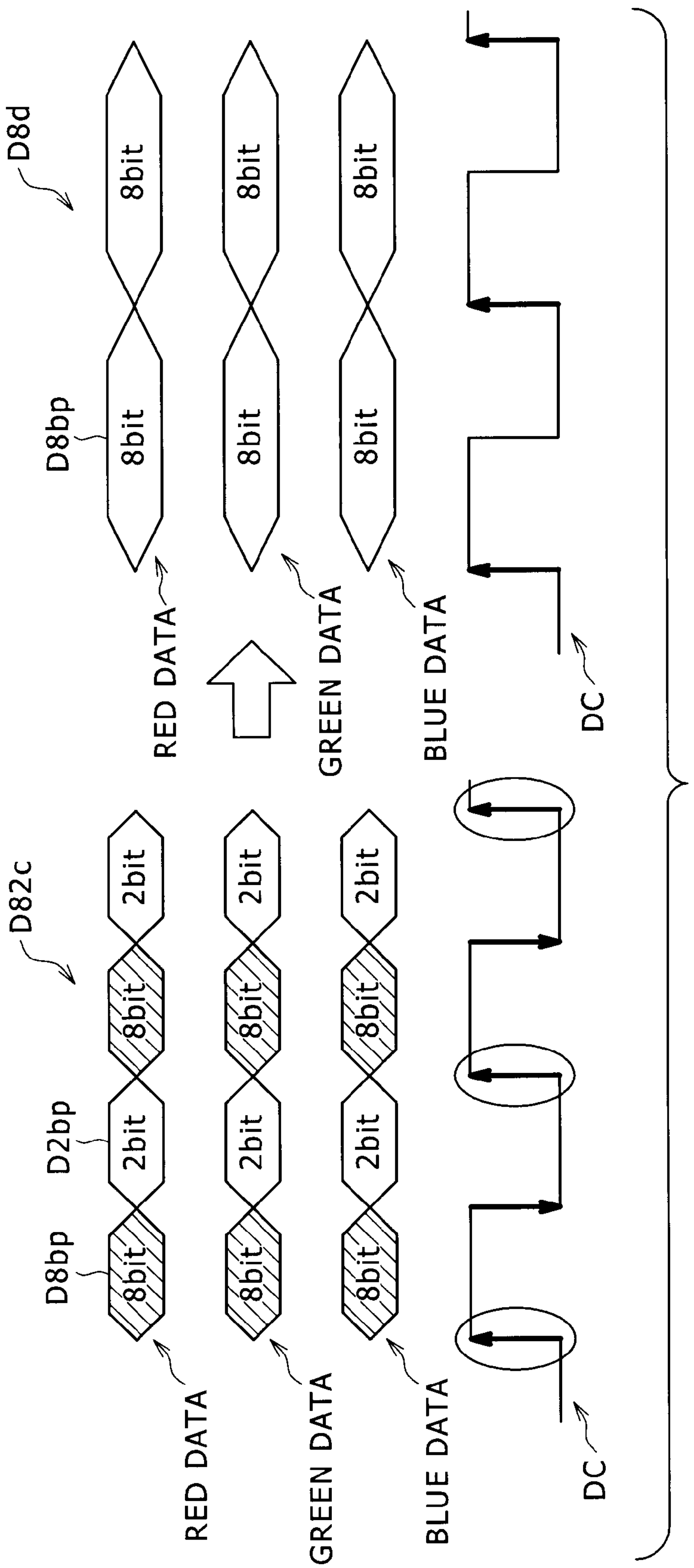
Figure 6:
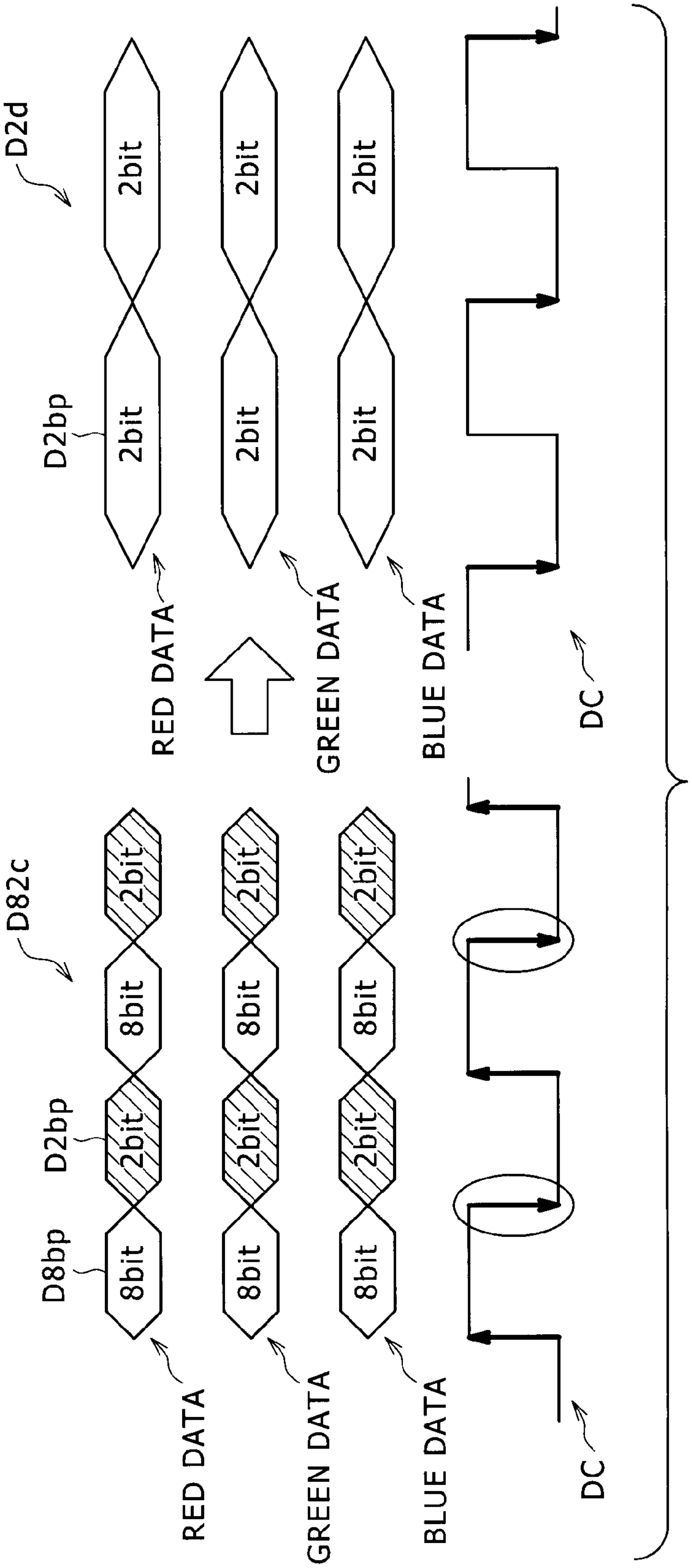

The sending apparatus may further include a multiplexer (for example, a data multiplexer 24 shown in FIG. 2) configured to separate the color data of 8+N bits which form the pixel data into the color data of 8 bits and the color data of N bits (for example, in a figure at an upper portion in FIG. 4, data D10*ap* which are red data (one of color data) of 10 bits are separated into data of the higher order 8 bits and data of the lower order 2 bits), place, for each of the color data after the separation, the color data of 8 bits into first data (for example, data D8*bp* shown in FIG. 4) of 8 bits which are effective at a rising edge of a dot clock while placing the color data of N bits into second data (for example, data D2*bp* shown in FIG. 4) of 8 bits which are effective at a falling edge of the dot clock, multiplex the first data and the second data and output multiplexed data (for example, data D82*c* shown in FIG. 4) obtained by the multiplexing for each of the color data, the transmission controller including a first transmission controller (for example, a master DVI transmission controller 25 shown in FIG. 2) configured to transmit data of 8 bits outputted for each color data after a timing of each rising edge of the dot clock from among the multiplexed data of the individual color data outputted from the multiplexer as the first data through the first transmission path (for example, refer to FIG. 5), and a second transmission controller (for example, a sub DVI transmission controller 26 shown in FIG. 2) configured to transmit data of 8 bits outputted for each color data after the timing of each falling edge of the dot clock from among the multiplexed data of the individual color data outputted from the multiplexer as the second data through the second transmission path (for example, refer to FIG. 6).

Figure 7:
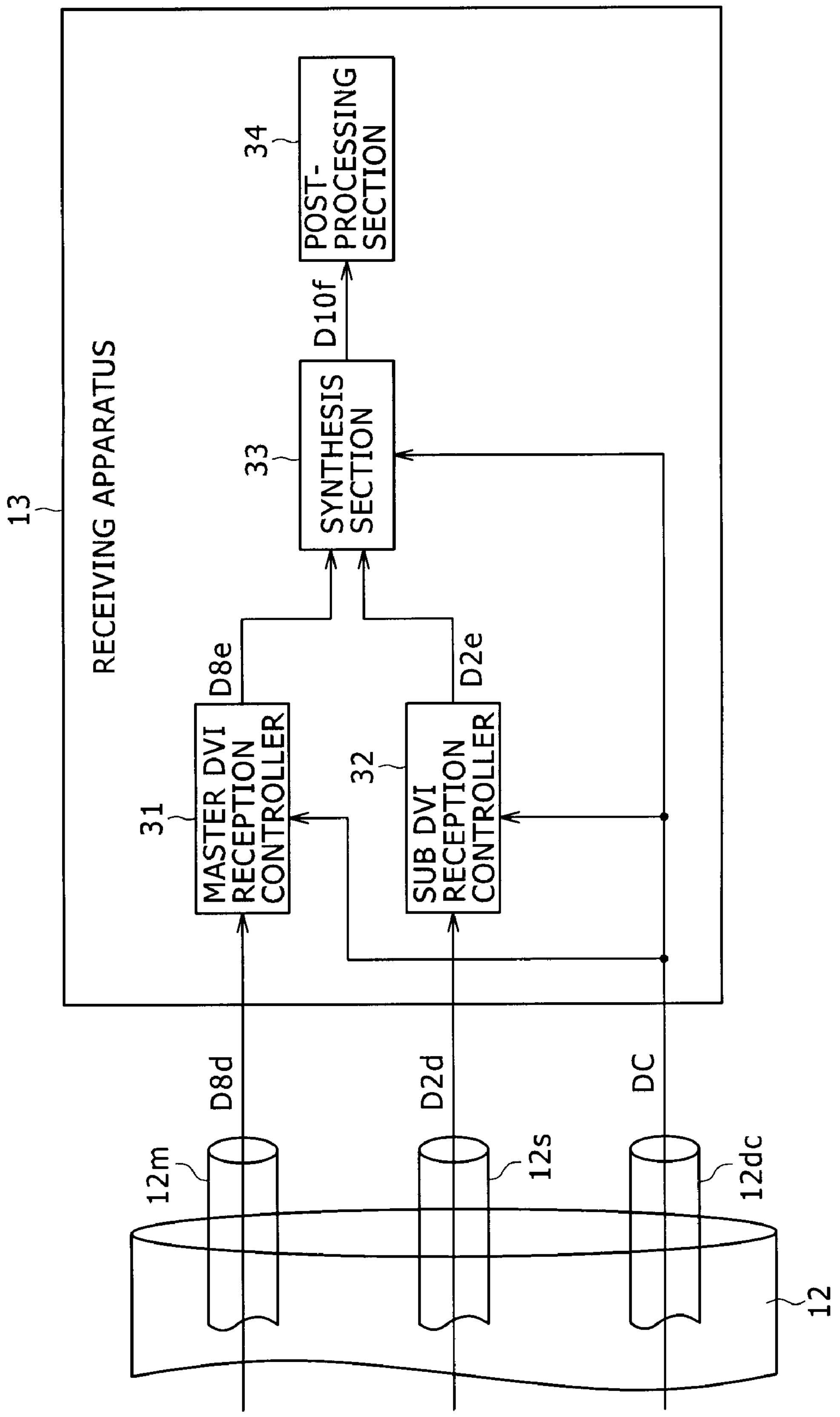
FIG. 7 is a block diagram showing an example of a functional configuration of a receiving apparatus of the communication system of FIG. 1.

According to a further embodiment of the present invention, there is provided a receiving apparatus (for example, a receiving apparatus 13 shown in FIG. 1 and having a functional configuration shown in FIG. 7) for receiving, when a DVI signal wherein pixel data formed from color data including red data, green data and blue data are disposed successively for the individually same color data is transmitted from a sending apparatus (for example, a sending apparatus 11 shown in FIG. 1) to the receiving apparatus through a DVI cable (for example, a DVI cable 12 shown in FIG. 1 or 7), the DVI signal, including a reception controller (for example, a master DVI reception controller 31 or a sub DVI reception controller 32 shown in FIG. 7) configured to control, when color data of 8 bits from within each of the pixel data formed from the color data of 8+N bits are transmitted through a first transmission path (for example, a transmission path 12*m* of FIG. 1 or 7) of the DVI cable, N being an arbitrary integral value equal to or greater than 1 but equal to or smaller than 8, and color data of the remaining N bits from within each of the pixel data are transmitted through a second transmission path (for example, a transmission path 12*s* of FIG. 1 or 7) of the DVI cable concurrently utilizing a Dual Link mode from the sending apparatus to the receiving apparatus, so as to receive the color data of 8 bits and the color data of N bits through the first transmission path and the second transmission path, respectively, and a synthesizer (for example, a synthesizer 33 shown in FIG. 7) configured to synthesize the color data of 8 bits and the color data of N bits received under the control of the reception controller to restore the pixel data.

Figure 9:
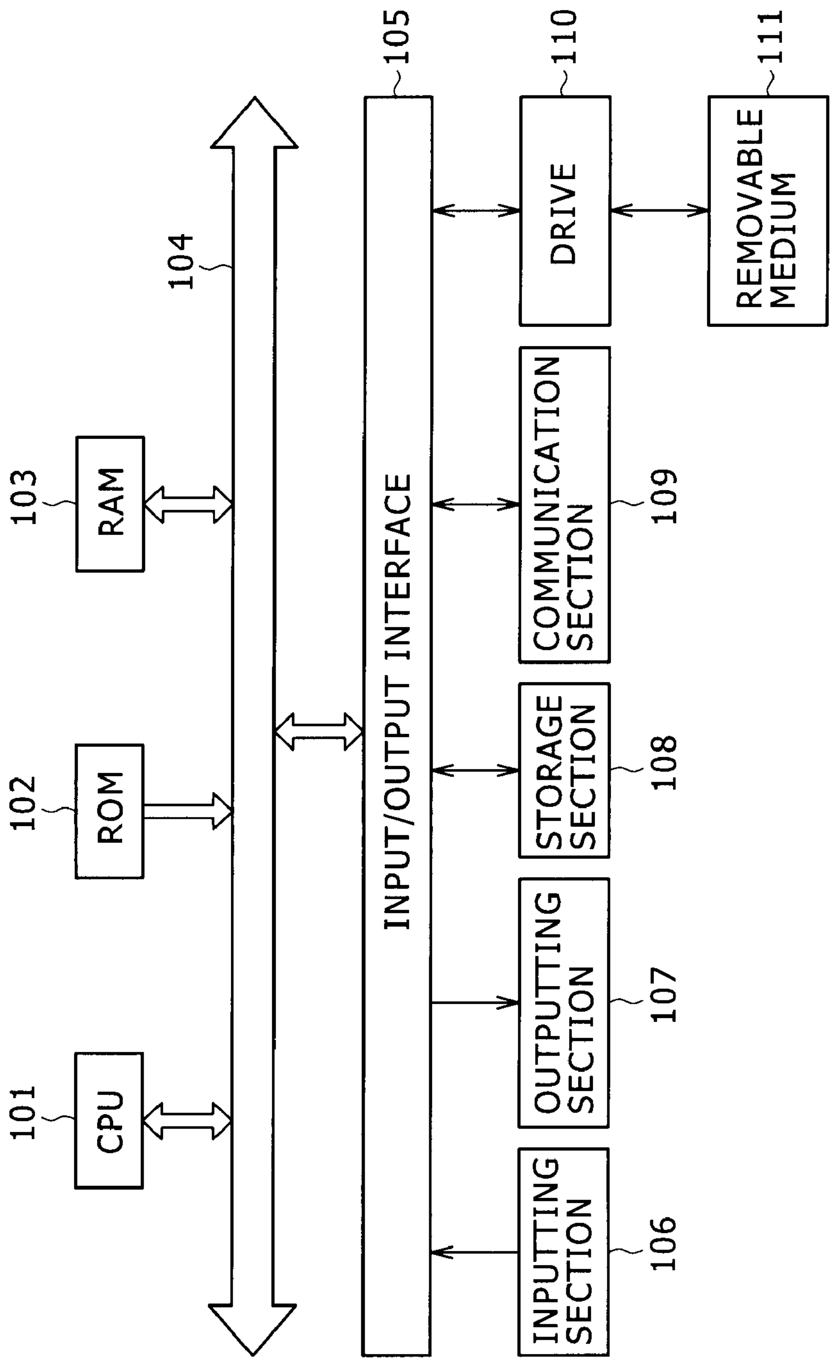
FIG. 9 is a block diagram showing an example of a configuration of a computer on which a process to which the present invention is applied is executed by software.

According to a still further embodiment of the present invention, there is provided a program which is ready for the sending apparatus or the receiving apparatus described above and is executed, for example, by a computer of FIG. 9.

In the following, a preferred embodiment of the present invention is described with reference to the accompanying drawings.

FIG. 1 shows an example of a configuration of a communication system to which the present invention is applied.

Referring to FIG. 1, the communication system shown transmits digital image data in the form of a DVI-D signal (signal of the DVI-D standards of the DVI signal). To this end, the communication system includes a sending apparatus 11 which may be formed from a personal computer or a like apparatus, a DVI cable 12, and a receiving apparatus 13 which may be a display apparatus or the like.

It is to be noted here that the communication system shown in FIG. 1 makes it possible to transmit pixel data of more than 8 bits using the Dual Link mode of the DVI-D standards. This makes it possible to expand the color gradients of R, G and B of the DVI-D signal to equal to or more than 256 gradations (equal to or more than 8 bits).

While the possibility in expansion is hereinafter described, it is assumed for the convenience of description that expansion to 10 bits is intended, that is, the unit of transmission of the DVI-D signal in the communication system shown in FIG. 1 is pixel data of 10 bits.

Also it is assumed that, as indicated by void arrow marks in FIG. 1, the DVI cable 12 of the communication system of FIG. 1 includes two transmission paths 12*m* and 12*s*. It is to be noted that a transmission path for exclusive use for a dot clock hereinafter described (that is, a transmission path 12*dc* of FIGS. 2 and 7) is not shown in FIG. 1.

In this instance, for example, as seen in FIG. 1, the sending apparatus 11 transmits, from among pixel data of 10 bits (red data, green data and blue data of 10 bits), those pixel data of predetermined 8 bits (red data, green data and blue data of predetermined 8 bits) to the receiving apparatus 13 through the transmission path 12*m* and concurrently transmits the remaining pixel data of 2 bits (red data, green data and blue rate of the remaining 2 bits) to the receiving apparatus 13 through the transmission path 12*s*. Consequently, as a transmission form of the DVI-D signal, pixel data can be transmitted in a unit of 10 bits. In other words, the color gradients of R, G and B colors of the DVI-D signal can be expanded to 10 bits greater than 8 bits.

It is significant here that, while, in existing systems, all of pixel data are transmitted through the single transmission path 12*m* in the DVI cable 12, according to an embodiment of the present invention, part of pixel data is transmitted through the transmission path 12*m* in the DVI cable 12 and the remaining part of the pixel data is transmitted concurrently through the other transmission path 12*s* in the DVI cable 12.

Further, in this instance, the object of transmission of the transmission path 12*m* may be part of the pixel data, and the object of transmission of the transmission path 12*s* may be the remaining part of the pixel data. In other words, the transmission objects of the transmission path 12*m* and the transmission path 12*s* shown in FIG. 1 are a mere example where the pixel data are formed from 10 bits. It is to be noted that another example of a transmission object is hereinafter described.

A block diagram showing an example of a functional configuration of the sending apparatus 11 of the communication system of FIG. 1 is shown in FIG. 2.

It is to be noted that the block diagram of FIG. 2 is for implementing functions to which the present invention is applied from among various functions which the sending apparatus 11 has. In particular, only those functional blocks which have several predetermined functions where the functions mentioned are classified into such predetermined functions are shown in FIG. 2. In other words, functional blocks for the other functions which the sending apparatus 11 has, for example, for a function of providing a user interface and a calculator function, are not shown in FIG. 2.

Further, each of the functional blocks shown in FIG. 2 may be formed from hardware itself or from software itself or otherwise from a combination of hardware and software. Further, a plurality of ones of the functional blocks may be collectively formed as a single functional block. Or alternatively, one functional block may be divided into smaller functional blocks. In other words, the sending apparatus 11 of FIG. 2 is not particularly restricted in form but may have various forms only if they have the functions which the functional blocks have.

In other words, while the sending apparatus 11 in FIG. 1 is shown formed from a personal computer, there is no necessity to particularly form the sending apparatus 11 from a personal computer.

Further, there is no necessity to cause the sending apparatus 11 to function particularly as an apparatus for exclusive use for transmission, but the sending apparatus 11 may include, in addition to the functional blocks shown in FIG. 2, various functional blocks hereinafter described with reference to FIG. 7 so that it may function as a sending/receiving apparatus.

The sending apparatus 11 shown in FIG. 2 includes a dot clock generation section 21, an original data generation/acquisition section 22, a data retainer 23, a data multiplexer 24, a master DVI transmission controller 25 and a sub DVI transmission controller 26.

Here, description is given taking notice only of the functional configuration of the sending apparatus 11, that is, only of interaction of the functional blocks. It is to be noted that details of the substance of output data, output timings and so forth of the functional blocks are hereinafter described. Accordingly, as regard the output data, they are referred to merely as output data without particularly defining them but are identified from the other output data only depending upon reference characters appended thereto.

The output data DC of the dot clock generation section 21 are provided to the original data generation/acquisition section 22 and the sub DVI transmission controller 26. Further, the output data DC of the dot clock generation section 21 are transmitted to the receiving apparatus 13 through the transmission path 12*dc* of the DVI cable 12.

The output data D10*a* of the original data generation/acquisition section 22 are retained by the data retainer 23. Part of the output data D10*a*, that is, data D8*b*, and the remaining part of the output data D10*a*, that is, data D2*b*, are read out from the data retainer 23 at a predetermined timing hereinafter described by the data multiplexer 24 and are multiplexed into data D82*c*. The data D82*c* are provided as output data of the data multiplexer 24 to the master DVI transmission controller 25 and the sub DVI transmission controller 26.

The data D82*c* of the data multiplexer 24 are multiplexed data of the data D8*b* and the data D2*b* as described hereinabove. Therefore, while data D8*d* corresponding to the data D8*b* from within the data D82*c* of the data multiplexer 24 are transmitted from the master DVI transmission controller 25 to the receiving apparatus 13 through the transmission path 12*m* of the DVI cable 12, data D2*d* corresponding to the data D2*b* from within the data D82*c* are transmitted concurrently from the sub DVI transmission controller 26 to the receiving apparatus 13 through the transmission path 12*s* of the DVI cable 12.

While details are hereinafter described, the data D8*d* of the master DVI transmission controller 25 shown in FIG. 2 are data formed from pixel data of predetermined 8 bits (read data, green data and blue data of predetermined 8 bits) disposed successively from among pixel data of 10 bits illustrated in FIG. 1 (that is, red data, green data and blue data of 10 bits). Meanwhile, the data D2*d* of the sub DVI transmission controller 26 shown in FIG. 2 are data formed from pixel data of the remaining 2 bits (read data, green data and blue data of the remaining 2 bits) disposed successively from among the pixel data of 10 bits illustrated in FIG. 1 (that is, red data, green data and blue data of 10 bits).

In the following, an example of operation of the sending apparatus 11 having such a functional configuration as described above is described together with description of the functions of the components 21 to 26 of the sending apparatus 11. Further, the timing charts of FIGS. 3 to 6 are suitably referred to in the description.

Figure 3:
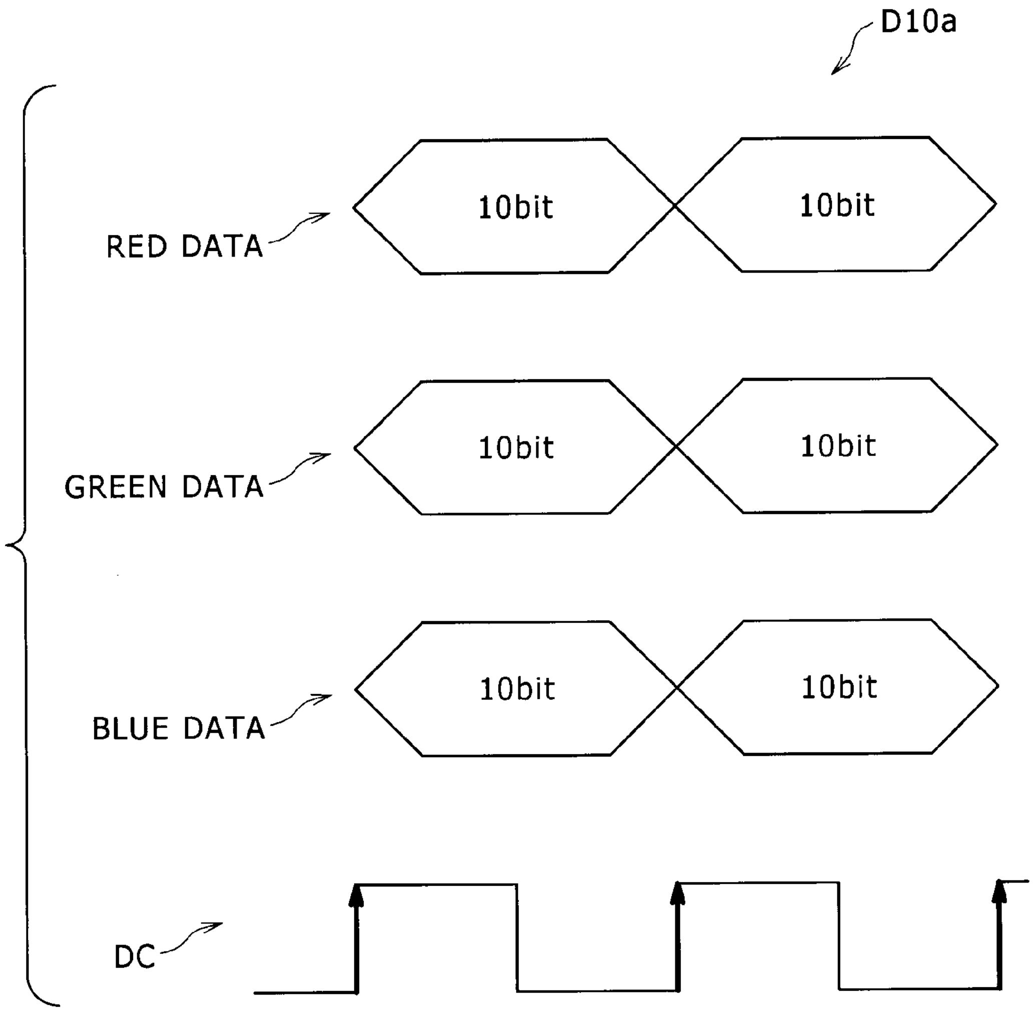
FIGS. 3 to 6 are timing charts illustrating an example of operation of the sending apparatus of FIG. 2.

As seen in FIG. 3 and so forth, the dot clock generation section 21 generates a dot clock DC of a predetermined period and provides the dot clock DC to the other components 22 to 26 of the sending apparatus 11. The dot clock DC is transmitted also to the receiving apparatus 13 side through the transmission path 12*dc* for exclusive use of the DVI cable 12. Consequently, the sending apparatus 11 and the receiving apparatus 13 can be synchronized with each other.

The original data generation/acquisition section 22 successively disposes plural pixel data formed from color data of 10 bits (data indicated by a hexagon in FIG. 2) of red data, green data and blue data for the individually same color data to produce output data D10*a* (hereinafter referred to as original data D10*a*) as a DVI-D signal of an object of transmission as seen in FIG. 3. It is to be noted that, as indicated by a broken line arrow mark in FIG. 2, the original data D10*a* are sometimes supplied from an external apparatus not shown and acquired by the original data generation/acquisition section 22.

Pixel data of 10 bits which compose the original data D10*a* are successively outputted from the original data generation/acquisition section 22 and stored into the data retainer 23 at timings of every rising edge of the dot clock DC, that is, at timings of each upwardly directed arrow mark of the dot clock DC in FIG. 3.

In particular, the data retainer 23 is formed, for example, as a buffer memory and retains the original data D10*a* outputted from the original data generation/acquisition section 22 in a unit of pixel data of 10 bits.

The data multiplexer 24 reads out pixel data of the predetermined 8 bits (red data, green data and blue data of the predetermined 8 bits) and pixel data of the remaining 2 bits (red data, green data and blue data of the remaining 2 bits) separately from each other from among the pixel data of 10 bits (red data, green data and blue data of 10 bits) retained in the data retainer 23. Then, the data multiplexer 24 places the thus read out pixel data of 8 bits into first data of 8 bits which are valid at a rising edge of the dot clock DC, and places the read out pixel data of 2 bits into second data of 8 bits which are valid at the rising edge of the dot clock DC. Further, the data multiplexer 24 multiplexes the first data and the second data and outputs resulting data D82*c*.

For example, as seen in FIG. 4, the data multiplexer 24 reads out pixel data D8*b* of predetermined 8 bits, for example, of the higher order 8 bits, from among pixel data of 10 bits retained in the data retainer 23 at the timing of a rising edge of the dot clock DC, that is, at the timing of an upwardly directed arrow mark of the dot clock DC in FIG. 4. Then, the data multiplexer 24 outputs the first data of 8 bits (data indicated by a hexagon denoted as 8 bit in FIG. 4) including the pixel data D8*b*. Then, at the timing of a next falling edge of the dot clock DC, that is, at the timing of a downwardly directed arrow mark of the dot clock DC in FIG. 4, the data multiplexer 24 reads out the pixel data D2*b* of the remaining 2 bits, that is, of the lower order 2 bits, from among the pixel data of 10 bits. Then, the data multiplexer 24 outputs the second data of 8 bits (data indicated by a hexagon denoted as 2 bit in FIG. 4) including the read out pixel data D2*b*. The sequence of processes described is executed repetitively in synchronism with the dot clock DC.

In particular, for example, as seen in a figure within a framework at an upper portion in FIG. 4, attention is paid to data D10*ap* which are red data of 10 bits from among pixel data of 10 bits of one predetermined pixel (from among red data, green data and blue data of 10 bits). In this instance, at the timing of a rising edge of the dot clock DC, red data of predetermined 8 bits, for example, red data of the higher order 8 bits, are read out from among the data D10*ap* retained in the data retainer 23 and included into and outputted together with the first data D8*bp* of 8 bits. Then, at the timing of a next falling edge of the dot clock DC, the red data of the remaining 2 bits, for example, the red data of the lower order 2 bits, are read out from among the data D10*ap*. Then, the read out red data of 2 bits are allocated to the higher order 2 bits of second data D2*bp*, and 0 data is allocated to the lower order 6 bits. Then, the completed second data D2*bp* are outputted.

Such a sequence of processes as described above is performed successively to perform data multiplexing of the red data. Also for the green data and the blue data, data multiplexing is performed concurrently and quite similarly. As a result, such multiplexed data D82*c* as seen in FIG. 4 are obtained. The multiplexed data D82*c* are outputted from the data multiplexer 24 and successively provided to the master DVI transmission controller 25 and the sub DVI transmission controller 26.

The master DVI transmission controller 25 transmits, as seen in FIG. 5, from among the multiplexed data D82*c* outputted thereto from the data multiplexer 24, those data of 8 bits from the timing of a rising edge of the dot clock DC, that is, first data of 8 bits (first data D8*bp* or the like) indicated by slanting lines later than a timing of an upwardly directed arrow mark of the dot clock DC in FIG. 5, to the receiving apparatus 13 through the transmission path 12*m* of the DVI cable 12. The master DVI transmission controller 25 repetitively performs the process just described in synchronism with the dot clock DC. Consequently, as seen from a figure on the right side in FIG. 5, data D8*d* (hereinafter referred to as master transmission data D8*d*) formed from first data (first data D8*bp* or the like) disposed successively and including pixel data of predetermined 8 bits from among the pixel data of 10 bits are transmitted from the master DVI transmission controller 25 to the receiving apparatus 13 through the transmission path 12*m* of the DVI cable 12.

Meanwhile, the sub DVI transmission controller 26 transmits, as seen in FIG. 6, from among the multiplexed data D82*c* outputted thereto from the data multiplexer 24, those data of 8 bits from the timing of a falling edge of the dot clock DC, that is, second data of 8 bits (second data D2*bp* or the like) indicated by slanting lines later than the timing of a downwardly directed arrow mark of the dot clock DC in FIG. 6 and including pixel data of the remaining 2 bits from among the pixel data of 10 bits, to the receiving apparatus 13 through the transmission path 12*s* of the DVI cable 12. The sub DVI transmission controller 26 repetitively performs the process just described in synchronism with the dot clock DC. Consequently, as seen from a figure on the right side in FIG. 6, data D2*d* (hereinafter referred to as sub transmission data D2*d*) in which second data (second data D2*bp* or the like) wherein the pixel data of the remaining 2 bits from among the pixel data of 10 bits are allocated to the higher order 2 bits and 0 data is allocated to the lower order 6 bits are disposed successively are transmitted from the sub DVI transmission controller 26 to the receiving apparatus 13 through the transmission path 12*s* of the DVI cable 12.

The sending apparatus 11 of the communication system of FIG. 1 has such a configuration as described above with reference to FIGS. 2 to 6.

Now, the receiving apparatus 13 of the first communication system is described with reference to FIGS. 7 and 8.

FIG. 7 shows an example of a functional configuration of the receiving apparatus 13.

It is to be noted that the block diagram of FIG. 7 is for implementing functions to which the present invention is applied from among various functions which the receiving apparatus 13 has. In particular, only those functional blocks which have several predetermined functions where the functions mentioned are classified into such predetermined functions are shown in FIG. 7. In other words, functional blocks for the other functions which the receiving apparatus 13 has, for example, for a function of providing a user interface and a display function, are not shown in FIG. 7 or are collectively included in a post-processing section 34.

Further, each of the functional blocks shown in FIG. 7 may be formed from hardware itself or from software itself or otherwise from a combination of hardware and software. Further, a plurality of ones of the functional blocks may be collectively formed as a single functional block. Or alternatively, one functional block may be divided into smaller functional blocks. In other words, the receiving apparatus 13 of FIG. 7 is not particularly restricted in form but may have various forms only if they have the functions which the functional blocks have.

In other words, while the receiving apparatus 13 in FIG. 1 is shown formed from a display apparatus, there is no necessity to particularly form the receiving apparatus 13 from a display apparatus.

Further, there is no necessity to cause the receiving apparatus 13 to function particularly as an apparatus for exclusive use for reception, but the receiving apparatus 13 may include, in addition to the functional blocks shown in FIG. 7, various functional blocks described hereinabove with reference to FIG. 2 so that it may function as a sending/receiving apparatus.

Referring to FIG. 7, the receiving apparatus 13 shown includes a master DVI reception controller 31, a sub DVI reception controller 32, a synthesis section 33 and a post-processing section 34.

Here, description is given taking notice only of the functional configuration of the receiving apparatus 13, that is, only of interaction of the functional blocks. It is to be noted that details of the substance of output data, output timings and so forth of the functional blocks are hereinafter described. Accordingly, as regard the output data, they are referred to merely as output data without particularly defining them but are identified from the other output data only depending upon reference characters appended thereto.

When master transmission data D8*d* are transmitted from the sending apparatus 11 to the receiving apparatus 13 through the transmission path 12*m* of the DVI cable 12, they are received by the master DVI reception controller 31 and provided as output data D8*e* to the synthesis section 33 at a predetermined timing hereinafter described.

Meanwhile, when sub transmission data D2*d* are transmitted from the sending apparatus 11 to the receiving apparatus 13 through the transmission path 12*s* of the DVI cable 12, they are received by the sub DVI reception controller 32 and provided as output data D2*e* to the synthesis section 33 at the predetermined timing hereinafter described.

On the other hand, when the dot clock DC is transmitted from the sending apparatus 11 to the receiving apparatus 13 through the transmission path 12*dc* of the DVI cable 12, it is provided to the master DVI reception controller 31, sub DVI reception controller 32 and synthesis section 33. It is to be noted that, though not shown in FIG. 7, the dot clock DC may be provided also to the post-processing section 34.

The synthesis section 33 synthesizes the output data D8*e* of the master DVI reception controller 31 and the output data D2*e* of the sub DVI reception controller 32 using a method hereinafter described. Data D10*f* obtained as a result of the synthesis are provided as output data to the post-processing section 34.

In the following, an example of operation of the receiving apparatus 13 having such a functional configuration as described above is described together with functions of the components 31 to 34 of the receiving apparatus 13 with reference also to a timing chart of FIG. 8.

As described hereinabove, when the master transmission data D8*d* are transmitted from the sending apparatus 11 to the receiving apparatus 13 through the transmission path 12*m* of the DVI cable 12, they are received by the master DVI reception controller 31.

The master transmission data D8*d* are formed from first data (first data D8*bp* or the like) disposed successively and each including pixel data of predetermined 8 bits (red data, green data and blue data of the predetermined 8 bits) from among pixel data of 10 bits illustrated in FIG. 1 (that is, red data, green data and blue data of 10 bits).

Figure 8:
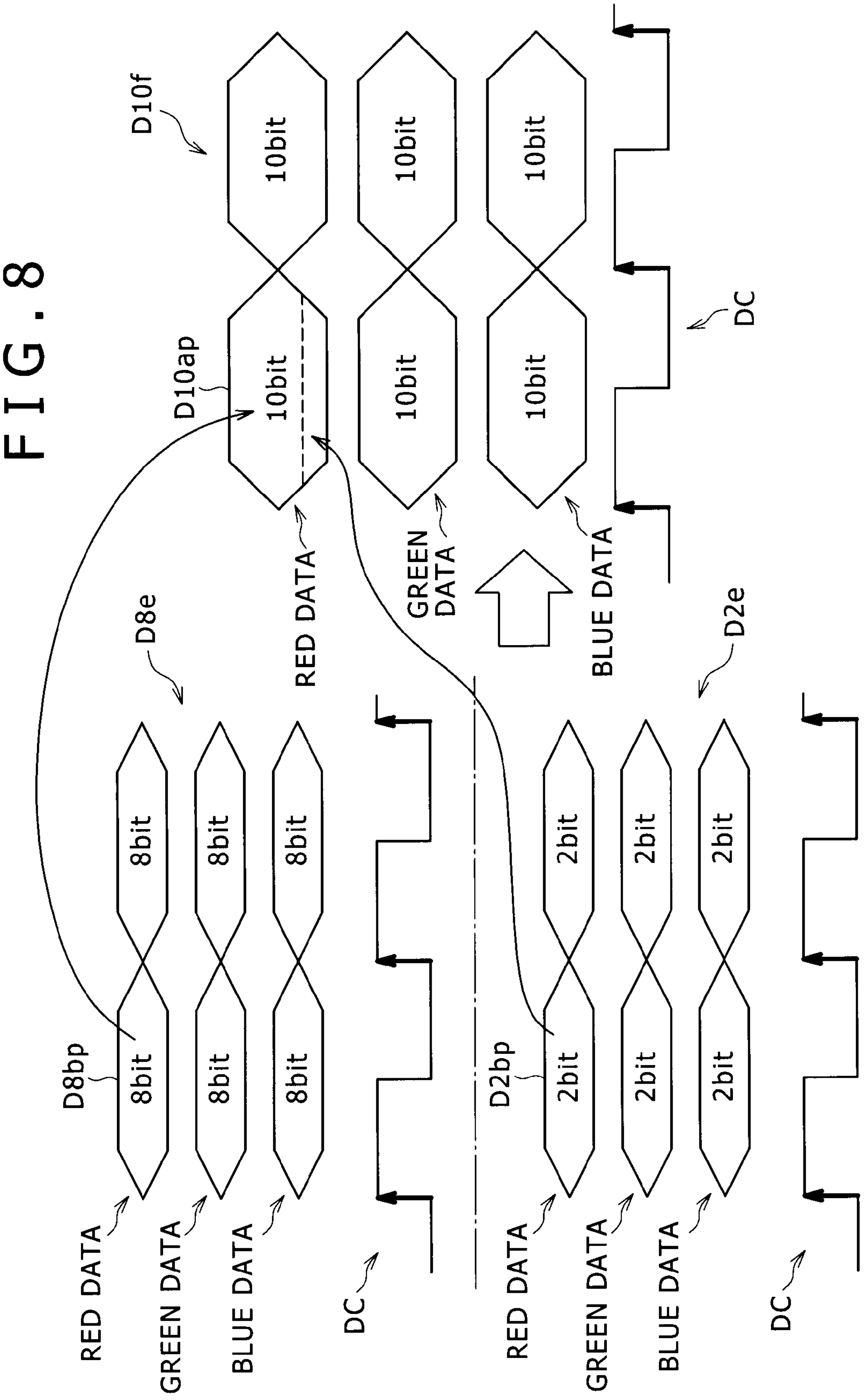
FIG. 8 is a timing chart illustrating an example of operation of the receiving apparatus of FIG. 7.

Therefore, the master DVI reception controller 31 successively outputs the first data (first data D8*bp* or the like) of 8 bits each at the timing of a rising edge of the dot clock DC, that is, at a timing of an upwardly directed arrow mark of the dot clock DC in FIG. 8) as seen in a figure at a left upper portion of FIG. 8. As a result, such output data D8*e* as seen at a left upper portion of FIG. 8 are provided from the master DVI reception controller 31 to the synthesis section 33. $1310

Also the sub transmission data D2*d* are transmitted from the sending apparatus 11 to the receiving apparatus 13 through the transmission path 12*s* of the DVI cable 12 in parallel to the master transmission data D8*d* described above. The sub transmission data D2*d* are received by the sub DVI reception controller 32.
$1311

The sub transmission data D2*d* are formed from second data (second data D2*bp* illustrated in FIG. 4 or the like) which are disposed successively and in which pixel data of the remaining 2 bits (red data, green data and blue data of the remaining 2 bits) from among the pixel data of 10 bits illustrated in FIG. 1 (red data, green data and blue data of 10 bits) are allocated to the higher order 2 bits and 0 data is applied to the lower order 6 bits.

Therefore, the sub DVI reception controller 32 successively outputs the second data of 8 bits (second data D2*bp* or the like) each at the timing of a rising edge of the dot clock DC, that is, at the timing of an upwardly directed arrow mark of the dot clock DC shown in FIG. 8 as seen from a figure at a left lower portion of FIG. 8. As a result, such output data D2*e* as seen at a left lower portion in FIG. 8 are provided from the sub DVI reception controller 32 to the synthesis section 33.

Thus, as seen from a figure at a right portion in FIG. 8, the synthesis section 33 synthesizes the output data D8*e* of the master DVI reception controller 31 and the output data D2*e* of the sub DVI reception controller 32 in synchronism with the dot clock DC. The synthesis section 33 provides synthetic data D10*f* obtained as a result of the synthesis to the post-processing section 34.

The synthetic data D10*f* are restored data of the original data D10*a* illustrated in FIG. 2 wherein pixel data of 10 bits are disposed successively. This can be recognized readily from comparison between FIGS. 3 and 8.

In particular, referring also to the figure within the framework at an upper portion in FIG. 4, the first data D8*bp* at the top 8 bits of the red data at the left upper portion in FIG. 8 includes red data of the predetermined 8 bits from among the data D10*ap* illustrated in FIG. 4. Meanwhile, the second data D2*bp* at the top 8 bits from among the red data in the figure at the left lower portion in FIG. 8 includes the red data of the remaining 2 bits of the data D10*ap* of FIG. 4 as data of the higher order 2 bits. The first data D8*bp* and the second data D2*bp* mentioned are provided at a timing of a rising edge of the dot clock DC, that is, in synchronism with each other, to the synthesis section 33. Accordingly, the synthesis section 33 synthesizes the first data D8*bp* and the second data D2*bp* (data of the higher order 2 bits of the second data D2*bp*) to restore the data D10*ap* illustrated in FIG. 4.

The post-processing section 34 executes a predetermined process utilizing the output data D10*f* of the synthesis section 33. For example, in the present embodiment, since the receiving apparatus 13 is formed as a display apparatus, the post-processing section 34 can be configured so as to have a function of displaying an image corresponding to the output data D10*f*. Such a configuration as described above allows display of an image wherein the gradient of pixels is expanded to 10 bits.

The communication apparatus to which the present invention is applied such as described above with reference to FIGS. 1 to 8.

Incidentally, the structure of the original data D10*a* produced or acquired by the original data generation/acquisition section 22, that is, the structure of pixel data of 10 bits (refer to FIG. 3 and so forth) of an object of transmission as the DVI-D signal, is not limited specifically. However, for example, the following structure can be applied preferably. In particular, pixel data of 10 bits preferably have such a structure that data which define basic 256 gradations are allocated to the higher order 8 bits and data for expansion to increased traditions are allocated to the remaining lower order 2 bits. This is because, even if such a situation that the sub transmission data D2*d* are not transmitted normally to the receiving apparatus 13 side should be caused by a transmission error or some other reason, if the master transmission data D8*d* can be transmitted normally, then although it is difficult to secure image display with a gradient of 10 bits, image display of a basic gradient of 8 bits, that is, image display with basic 256 gradations, can be assured. In other words, this is because image failure caused by a transmission error or the like can be prevented.

Further, while the foregoing description is directed to the method of expanding the color gradient of R, G and B colors regarding the DVI-D signal from 8 bits according to the existing technique to 10 bits including additional 2 bits, also it is easy to apply the present invention to expand the color gradient to more than 10 bits.

In particular, in the example described hereinabove, the Dual Link mode of the DVI-D standards is utilized such that first data of 8 bits are transmitted using one of the two transmission paths of the DVI cable 12, that is, the transmission path 12*m* while second data of 8 bits are transmitted using the other transmission path 12*s*. Further, pixel data of predetermined 8 bits from among pixel data of 10 bits are included into the first data while pixel data of the remaining 2 bits are included in the second data. In other words, although the structure of the second data transmitted using the transmission path 12*s* has an 8-bit data structure, it only uses the higher order 2 bits from among the 8 bits as described hereinabove with reference to FIG. 4. In other words, the structure does not use the lower order 6 bits.

However, it is possible for the second data to include real data of 8 bits. Therefore, it is possible to place data of 8 bits into the first data to be transmitted by the transmission path 12*m* which is one of the two transmission paths of the DVI cable 12 and place data of 8 bits into the second data to be transmitted by the other transmission path 12*s*. This signifies that the color gradient of R, G and B colors can be expanded up to 16 bits readily.

Furthermore, also expansion to a gradation representation which uses, example, a floating point can be made by applying the present invention. In particular, for example, if it is defined that the color gradient of colors R, G and B is represented as "f×2 to the eth power", that is, "$(f\times2)^e$", then it is possible to place the mantissa (f) into the first data to be transmitted through the transmission path 12*m* which is one of the two transmission paths of the DVI cable 12 and place the exponent part (e) into the second data to be transmitted through the other transmission path 12*s*.

In this instance, it is possible to place 8 bits into both of the first data to be transmitted by the transmission path 12*m* and the second data to be transmitted by the transmission path 12*s* as described hereinabove. Therefore, it is possible to transmit the values from 1 to 255 as the mantissa (f) and transmit the values from −7 to +7 as the exponent part (e).

Consequently, the color gradient of colors R, G and B can be represented within a range from "$(1\times2)^{-7}$" to "$(255\times2)^{+7}$". In other words, it is possible to transmit gradation data ranging from 1/128 to 32,640 as color data of red data, green data and blue data. This signifies that pixel data of a combination of color data of the three primary colors can be represented in "$2^{66}$" different color combinations. In other words, it is signified that gradations approximately 8 billion times a maximum gradation number implemented by existing display apparatus which is approximately 1 billion colors ($2^{30}$ colors) can be represented.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

FIG. 9 shows an example of a configuration of a personal computer which executes the series of processes described hereinabove in accordance with a program. In particular, all or part of the communication apparatus 11 shown in FIG. 1, for example, several ones of the functional blocks shown in FIG. 2, can be configured in such a manner as seen in FIG. 9. Also it is possible to configure all or part of the receiving apparatus 13 shown in FIG. 1, for example, several ones of the functional blocks shown in FIG. 7 as seen in FIG. 9.

Referring to FIG. 7, a central processing unit (CPU) 101 executes various processes in accordance with a program stored in a ROM (Read Only Memory) 102 or a storage section 108. Programs to be executed by the CPU 101 and data are suitably stored into a RAM (Random Access Memory) 103. The CPU 101, ROM 102 and RAM 103 are connected to one another by a bus 104.

Also an input/output interface 105 is connected to the CPU 101 through the bus 104. An inputting section 106 including a keyboard, a mouse, a microphone and so forth and an outputting section 107 including a display unit, a speaker and so forth are connected to the input/output interface 105. The CPU 101 executes various processes in accordance with an instruction inputted from the inputting section 106. The CPU 101 outputs a result of processing to the outputting section 107.

A storage section 108 is connected to the input/output interface 105 and formed from a hard disk or the like and stores programs to be executed by the CPU 101 and various data. Also a communication section 109 is connected to the input/output interface and communicates with an external apparatus through a network such as the Internet or a local area network.

A program may be acquired through the communication section 109 and stored into the storage section 108.

Further, as occasion demands, a drive 110 is connected to the input/output interface 105. When a removable medium 111 such as a magnetic disk, an optical disk, a magneto-optical disk or a semiconductor memory is loaded into the drive 110, the drive 110 drives the removable medium 111 and acquires a program, data or the like recorded on the removable medium. The acquired program or data are transferred to and stored into the storage section 108 as occasion demands.

The program recording medium on which a program to be installed into a computer and placed into an executable condition by the computer is recorded may be, for example, as shown in FIG. 9, a removable medium 111 in the form of a package medium formed from a magnetic disk (including a floppy disk), an optical disk (including a CD-ROM (Compact Disk-Read Only Memory) and a DVD (Digital Versatile Disk)), a magneto-optical disk, or a semiconductor memory. Else, the program recording medium may be formed as the ROM 102, a hard disk included in the storage section 108 or the like in which the program is recorded temporarily or permanently. Storage of the program into the program recording medium is performed, as occasion demands, through the communication section 109 which is an interface such as a router and a modem, making use of a wired or wireless communication medium such as a local area network, the Internet or a digital satellite broadcast.

It is to be noted that the communication section 109 can carry out communication in accordance with the DVI-D standards. In other words, the communication section 109 allows connection thereto of the DVI cable 12 shown in FIG. 1.

It is to be noted that, in the present specification, the term "system" is used to represent an entire apparatus or circuit composed of a plurality of devices or apparatus or circuits.

While a preferred embodiment of the present invention has been described using specific terms, such description is for illustrative purpose only, and it is to be understood that changes and variations may be made without departing from the spirit or scope of the following claims.

What is claimed is:

1. A communication system, comprising:

a sending apparatus configured to transmit a Digital Visual Interface signal wherein pixel data formed from color data including red data, green data and blue data are disposed successively for the individually same color data through a Digital Visual Interface cable; and a receiving apparatus configured to receive the Digital Visual Interface signal transmitted from said sending apparatus through said Digital Visual Interface cable, said sending apparatus being configured to utilize a Dual Link mode to transmit color data of 8 bits from within each of the pixel data formed from color data of 8+N bits to said receiving apparatus through a first transmission path of said Digital Visual Interface cable, N being an integral value equal to or greater than 1 but equal to or smaller than 8, and to transmit color data of the remaining N bits from within each of the pixel data to said receiving apparatus through a second transmission path of said Digital Visual Interface cable, said sending apparatus including a multiplexer configured to separate the color data of 8+N bits which form the pixel data into the color data of 8 bits and the color data of N bits, to place, after separation, the color data of 8 bits into first data of 8 bits which are effective at a rising edge of a dot clock while placing the color data of N bits into second data of 8 bits which are effective at a falling edge of the dot clock, to multiplex the first data and the second data, and to output multiplexed data obtained by multiplexing for each of the color data of 8 bits and the color data of N bits, and said receiving apparatus being configured to receive the color data of 8 bits and the color data of N bits through said first transmission path and said second transmission path, respectively, and to synthesize the color data of 8 bits and the color data of N bits to restore the pixel data.

2. A communication method for a communication system which includes a sending apparatus configured to transmit a Digital Visual Interface signal wherein pixel data formed from color data including red data, green data and blue data are disposed successively for the individually same color data through a Digital Visual Interface cable, and a receiving apparatus configured to receive the Digital Visual Interface signal transmitted from the sending apparatus through the Digital Visual Interface cable, the method executed by the sending apparatus comprising:

utilizing a Dual Link mode to transmit color data of 8 bits from within each of the pixel data formed from color data of 8+N bits to the receiving apparatus through a first transmission path of the Digital Visual Interface cable, N being an integral value equal to or greater than 1 but equal to or smaller than 8, and to transmit color data of the remaining N bits from within each of the pixel data to the receiving apparatus through a second transmission path of the Digital Visual Interface cable;

separating, with a multiplexer, the color data of 8+N bits which form the pixel data into the color data of 8 bits and the color data of N bits;

placing, with the multiplexer, after the separating, the color data of 8 bits into first data of 8 bits which are effective at a rising edge of a dot clock while placing the color data of N bits into second data of 8 bits which are effective at a falling edge of the dot clock;

multiplexing, with the multiplexer, the first data and the second data; and outputting, with the multiplexer, multiplexed data obtained by the multiplexing for each of the color data of 8 bits and the color data of N bits, and, the method executed by the receiving apparatus comprising:

receiving the color data of 8 bits and the color data of N bits through the first transmission path and the second transmission path, respectively; and synthesizing the color data of 8 bits and the color data of N bits to restore the pixel data.

3. A sending apparatus for transmitting a Digital Visual Interface signal wherein pixel data formed from color data including red data, green data and blue data are disposed successively for the individually same color data through a Digital Visual Interface cable, comprising:

a transmission controller configured to control to utilize a Dual Link mode to transmit color data of 8 bits from within each of the pixel data formed from color data of 8+N bits through a first transmission path of said Digital Visual Interface cable, N being an integral value equal to or greater than 1 but equal to or smaller than 8, and to transmit color data of the remaining N bits from within each of the pixel data through a second transmission path of said Digital Visual Interface cable; and a multiplexer configured to separate the color data of 8+N bits which form the pixel data into the color data of 8 bits and the color data of N bits, to place, after separation, the color data of 8 bits into first data of 8 bits which are effective at a rising edge of a dot clock while placing the color data of N bits into second data of 8 bits which are effective at a falling edge of the dot clock, to multiplex the first data and the second data, and to output multiplexed data obtained by multiplexing for each of the color data of 8 bits and the color data of N bits.

4. A sending apparatus for transmitting a Digital Visual Interface signal wherein pixel data formed from color data including red data, green data and blue data are disposed successively for the individually same color data through a Digital Visual Interface cable, comprising:

a transmission controller configured to control to utilize a Dual Link mode to transmit color data of 8 bits from within each of the pixel data formed from color data of 8+N bits through a first transmission path of said Digital Visual Interface cable, N being an integral value equal to or greater than 1 but equal to or smaller than 8, and to transmit color data of the remaining N bits from within each of the pixel data through a second transmission path of said Digital Visual Interface cable; and a multiplexer configured to separate the color data of 8+N bits which form the pixel data into the color data of 8 bits and the color data of N bits, to place, for each of the color data after separation, the color data of 8 bits into first data of 8 bits which are effective at a rising edge of a dot clock while placing the color data of N bits into second data of 8 bits which are effective at a falling edge of the dot clock, to multiplex the first data and the second data and to output multiplexed data obtained by multiplexing for each of the color data of 8 bits and the color data of N bits, said transmission controller further including:

a first transmission controller configured to transmit data of 8 bits outputted after a timing of each rising edge of the dot clock from among the multiplexed data of individual color data outputted from said multiplexer as the first data through said first transmission path; and a second transmission controller configured to transmit data of 8 bits outputted after a timing of each falling edge of the dot clock from among the multiplexed data of the individual color data outputted from said multiplexer as the second data through said second transmission path.

5. A transmission method for a sending apparatus for transmitting a Digital Visual Interface signal wherein pixel data formed from color data including red data, green data and blue data are disposed successively for the individually same color data through a Digital Visual Interface cable, comprising:

utilizing a Dual Link mode to transmit color data of 8 bits from within each of the pixel data formed from color data of 8+N bits through a first transmission path of the Digital Visual Interface cable, N being an integral value equal to or greater than 1 but equal to or smaller than 8, and to transmit color data of the remaining N bits from within each of the pixel data through a second transmission path of the Digital Visual Interface cable;

separating, with a multiplexer, the color data of 8+N bits which form the pixel data into the color data of 8 bits and the color data of N bits;

placing, with the multiplexer, after the separating, the color data of 8 bits into first data of 8 bits which are effective at a rising edge of a dot clock while placing the color data of N bits into second data of 8 bits which are effective at a falling edge of the dot clock;

multiplexing, with the multiplexer, the first data and the second data; and outputting, with the multiplexer, multiplexed data obtained by the multiplexing for each of the color data of 8 bits and the color data of N bits.

6. A storage memory encoded with a program for causing a computer to control a transmission of a Digital Visual Interface signal wherein pixel data formed from color data including red data, green data and blue data are disposed successively for the individually same color data through a Digital Visual Interface cable, comprising:

utilizing a Dual Link mode to transmit color data of 8 bits from within each of the pixel data formed from color data of 8+N bits through a first transmission path of the Digital Visual Interface cable, N being an integral value equal to or greater than 1 but equal to or smaller than 8, and to transmit color data of the remaining N bits from within each of the pixel data through a second transmission path of the Digital Visual Interface cable;

separating, with a multiplexer, the color data of 8+N bits which form the pixel data into the color data of 8 bits and the color data of N bits;

placing, with the multiplexer, after the separating, the color data of 8 bits into first data of 8 bits which are effective at a rising edge of a dot clock while placing the color data of N bits into second data of 8 bits which are effective at a falling edge of the dot clock; multiplexing, with the multiplexer, the first data and the second data; and outputting, with the multiplexer, multiplexed data obtained by the multiplexing for each of the color data of 8 bits and the color data of N bits.

7. A receiving apparatus for receiving, when a Digital Visual Interface signal wherein pixel data formed from color data including red data, green data and blue data are disposed successively for the individually same color data is transmitted from a sending apparatus to said receiving apparatus through a Digital Visual Interface cable, the Digital Visual Interface signal, comprising:

a reception controller configured to control, when color data of 8 bits from within each of the pixel data formed from color data of 8+N bits are transmitted through a first transmission path of said Digital Visual Interface cable, N being an integral value equal to or greater than 1 but equal to or smaller than 8, and color data of the remaining N bits from within each of the pixel data are transmitted through a second transmission path of said Digital Visual Interface cable concurrently utilizing a Dual Link mode from said sending apparatus to said receiving apparatus, to receive the color data of 8 bits and the color data of N bits through said first transmission path and said second transmission path, respectively, to control to receive a dot clock through a third transmission path of said Digital Visual Interface cable, and to output the color data of 8 bits and the color data of N bits at a same one of a rising edge and a falling edge of the dot clock; and a synthesizer configured to synthesize the color data of 8 bits and the color data of N bits to restore the pixel data.

8. A reception method for a receiving apparatus for receiving, when a Digital Visual Interface signal wherein pixel data formed from color data including red data, green data and blue data are disposed successively for the individually same color data is transmitted from a sending apparatus to the receiving apparatus through a Digital Visual Interface cable, the Digital Visual Interface signal, comprising:

receiving, when color data of 8 bits from within each of the pixel data formed from color data of 8+N bits are transmitted through a first transmission path of the Digital Visual Interface cable, N being an integral value equal to or greater than 1 but equal to or smaller than 8, and color data of the remaining N bits from within each of the pixel data are transmitted through a second transmission path of the Digital Visual Interface cable concurrently utilizing a Dual Link mode from the sending apparatus to the receiving apparatus, the color data of 8 bits and the color data of N bits through the first transmission path and the second transmission path, respectively;

receiving a dot clock through a third transmission path of said Digital Visual Interface cable;

outputting the color data of 8 bits and the color data of N bits at a same one of a rising edge and a falling edge of the dot clock; and synthesizing the color data of 8 bits and the color data of N bits to restore the pixel data.

9. A storage memory encoded with a program for causing a computer to carry out control so-as to receive, when a Digital Visual Interface signal wherein pixel data formed from color data including red data, green data and blue data are disposed successively for the individually same color data is transmitted from a sending apparatus to the computer through a Digital Visual Interface cable, the Digital Visual Interface signal, comprising:

receiving, when color data of 8 bits from within each of the pixel data formed from color data of 8+N bits are transmitted through a first transmission path of the Digital Visual Interface cable, N being an integral value equal to or greater than 1 but equal to or smaller than 8, and color data of the remaining N bits from within each of the pixel data are transmitted through a second transmission path of the Digital Visual Interface cable concurrently utilizing a Dual Link mode from the sending apparatus to the computer, the color data of 8 bits and the color data of N bits through the first transmission path and the second transmission path, respectively;

receiving a dot clock through a third transmission path of said Digital Visual Interface cable;

outputting the color data of 8 bits and the color data of N bits at a same one of a rising edge and a falling edge of the dot clock; and synthesizing the color data of 8 bits and the color data of N bits to restore the pixel data.

* * * * *